Figure 1:
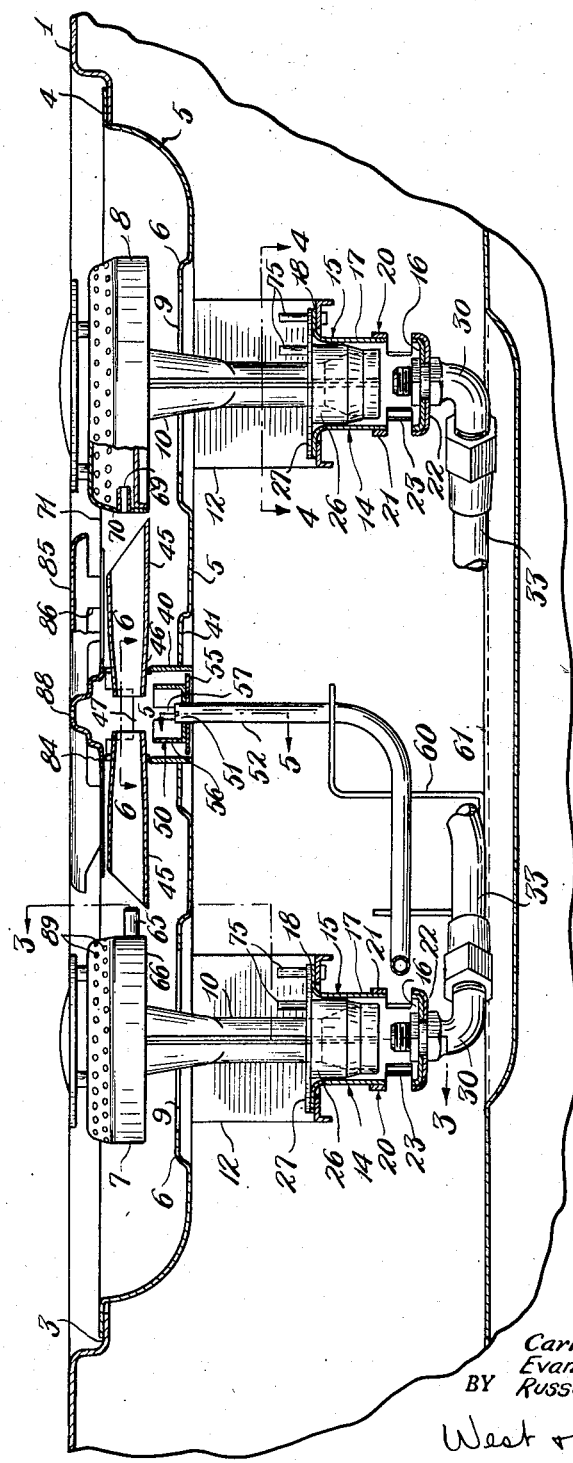

Aug. 25, 1953          C. F. SCHLENK ET AL          2,649,850
            TOP BURNER ASSEMBLY, INCLUDING A FLASH TUBE
               LIGHTER FOR COOKING STOVES OR RANGES
Filed Feb. 11, 1950                           3 Sheets-Sheet 1

INVENTORS
Carl F. Schlenk
Evans W. Cheeseman
BY Russell L. Patrick

West &Oldham
Attorneys

INVENTORS
Carl F. Schlenk
Evans W. Cheeseman
Russell L. Patrick
BY
West + Oldham
Attorneys Aug. 25, 1953 C. F. SCHLENK ET AL 2,649,850
TOP BURNER ASSEMBLY, INCLUDING A FLASH TUBE
LIGHTER FOR COOKING STOVES OR RANGES
Filed Feb. 11, 1950 3 Sheets-Sheet 3

INVENTORS
Carl F. Schlenk
Evans W. Cheeseman
BY Russell L. Patrick

West & Oldham
Attorneys

Patented Aug. 25, 1953

2,649,850

UNITED STATES PATENT OFFICE 2,649,850

TOP BURNER ASSEMBLY, INCLUDING A FLASH TUBE LIGHTER FOR COOKING STOVES OR RANGES

Carl F. Schlenk, Cleveland Heights, Evans W. Cheeseman, Lakewood, and Russell L. Patrick, Cleveland, Ohio, assignors to Perfection Stove Company, Cleveland, Ohio, a corporation of Ohio Application February 11, 1950, Serial No. 143,758

16 Claims. (Cl. 126—39)

1

This invention relates, generally, to gas cooking stoves or ranges, and more particularly to automatic lighting means for the top burners thereof.

The invention consists of improvements in the design, construction and arrangement of parts that make up a top burner assembly, with particular reference to the automatic flash tube lighter.

As a preliminary to a more detailed description, and so that the nature of the invention may be more readily understood, it may be explained that the top burner assembly, according to the most comprehensive and preferred form of the invention, includes two different size cooking burners, commonly referred to in the art as main burners. Associated with each main burner is a support therefor that is secured to and depends from the stove top and incorporates a mixer and air shutter for the corresponding main burner, the connection between the burner and mixer being of a slip-joint character so that the burner proper, including its Venturi or mixing tube, may be lifted from the support and mixer and thus easily and quickly removed from the assembly. A so-called pilot light, or pilot burner, forms a part of the assembly, as does also a removable aeration plate that surrounds the main burners and underlies the heads thereof and permanently mounts a pilot light housing equipped with flash tubes through which gas and ignition are communicated between the pilot light and main burners.

The invention contemplates the use of two such assemblies in a cooking stove or range of usual size, and in the popular divided-top model, one assembly is located adjacent each side of a relatively wide stove top.

The main purpose of the invention is to provide a top burner assembly that may be easily and quickly dismantled and all parts thereof conveniently and thoroughly cleaned and, with equal facility, reassembled in definite operative relation to one another, this latter result being assured by the manner in which the parts are made to accurately interengage.

Another object is to provide, in an assembly of the above character, a support for a main burner which includes, as a permanent part thereof, the mixer and air shutter of said burner, and with respect to which the burner, including its Venturi or mixing tube, is readily removable, preferably by the simple operation of lifting the burner from the support. The principal advantage of such an arrangement is that the adjustment of the air shutter, which may be peculiar or individual to the burner involved, is undisturbed by the removal and replacement of the burner.

Another object is to provide—in an assembly which includes a main burner, a pilot light or burner, and a flash tube through which gas and ignition are communicated between the two—positioning means that insures proper relation between the main burner and the flash tube when the main burner is returned to the assembly after having been removed therefrom for cleaning or other purposes. A related object is to provide, in an assembly of this character which includes two different size main burners and a flash tube for each, means that will prevent accidental interchange of the main burners. One reason why this is important is that the air shutters of the mixers for the different size burners may call for different adjustments, and each burner may require a gas emitting tip having an outlet orifice of different area from that of the other.

Another object is to provide a pilot light or burner, and a housing therefor, that are so constructed and related as to afford a proper supply and control of air to the pilot burner, thereby to insure a clean and efficient flame and proper ventilation of the housing, and so that the pilot light will not be extinguished by casual drafts, and to the further end that the surrounding portions of the structure, which ordinarily are coated with vitreous enamel, are protected from undue heating and discoloration, the former, if permitted, frequently resulting in cracking and chipping of the enamel.

Other more general objects are to provide an automatic flash tube lighter for the top burners of cooking stoves or ranges that is thoroughly dependable; that is quick of action; that is not likely to get out of order; and that operates with the minimum of escaping gas incident to lighting and therefore safe and free from objectionable fumes and explosive action.

The present preferred embodiment of the invention is illustrated in the accompanying drawings, wherein like reference characters designate like parts throughout the several views.

Figure 2:
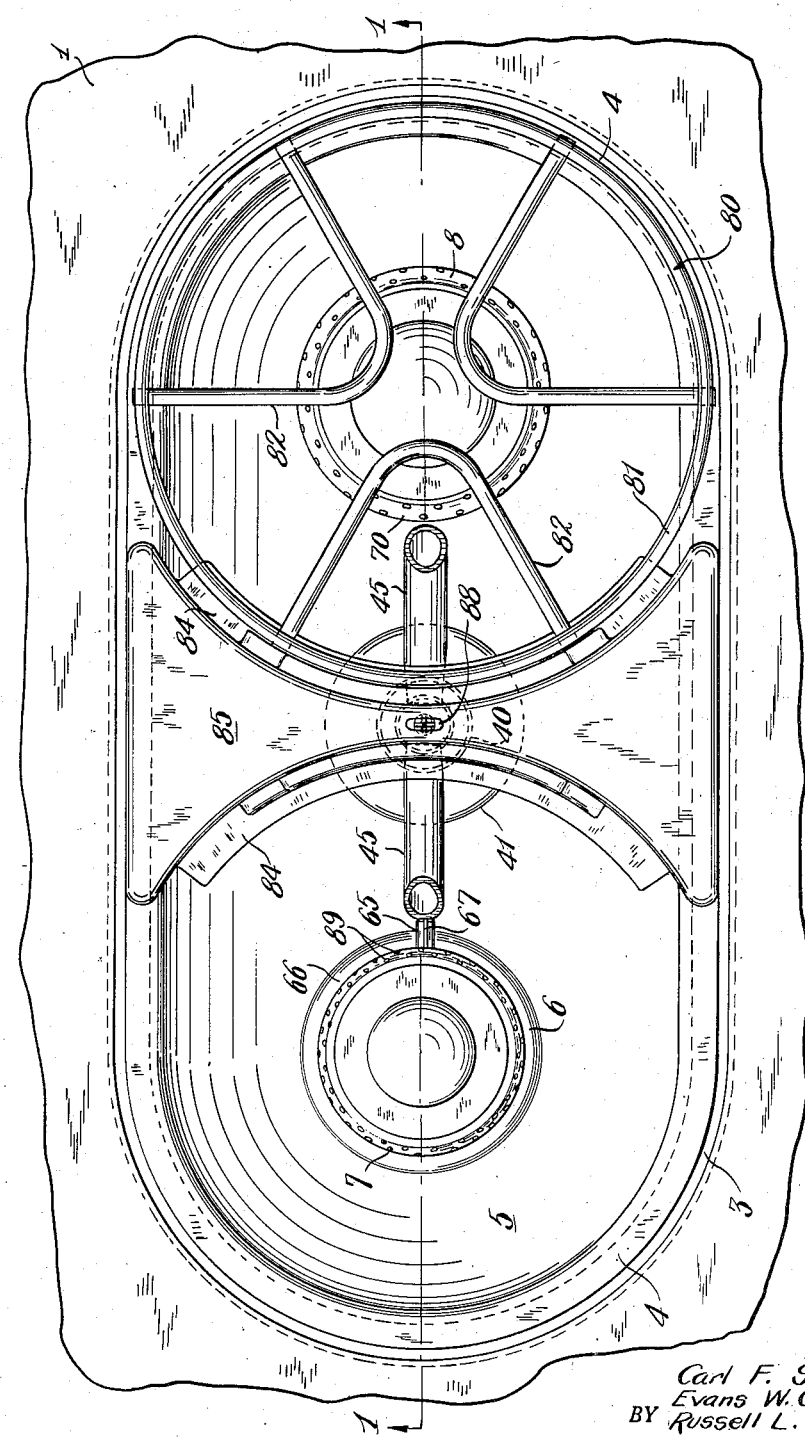
Figure 5:
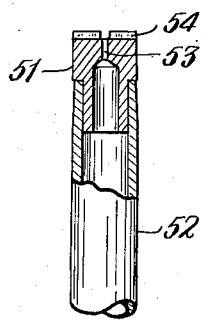
Figure 4:
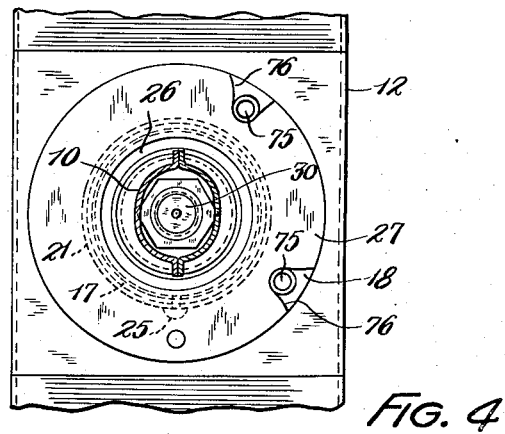
Figure 3:
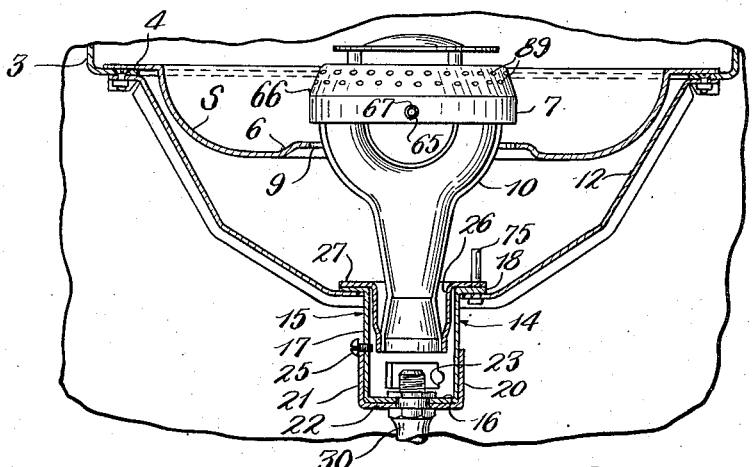
Figure 6:
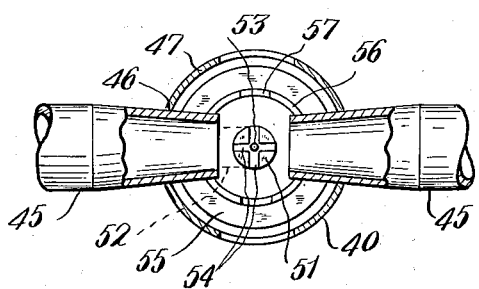

In the drawings, Fig. 1 represents a central vertical longitudinal section through a top burner assembly constructed in accordance with the invention, the plane of section being indicated by the line 1—1 of Fig. 2; Fig. 2 is a plan view of the assembly, and includes the surrounding portion of the stove top; Fig. 3 is a transverse section, on the line 3—3 of Fig. 1; and Figs. 4, 5 and 6 are sectional details on the respective lines 4—4, 5—5 and 6—6 of Fig. 1, and on a scale twice that of the other views.

Within the area of a burner assembly, the stove or range top 1 is provided with an oblong opening that is shown as surrounded by a depressed seat 3 whereon the peripheral flange 4 of an aeration plate 5 rests. This aeration plate is in the form of a shallow basin, preferably having upwardly embossed or elevated portions 6 in the region of the main burners 7 and 8, said elevated portions being provided with relatively large openings 9 through which the mixing or Venturi tubes 10 of the burners extend.

Secured to and depending from the stove top 1, in the transverse vertical plane occupied by each of the burners 7 and 8, is a yoke-like burner support 12. Each burner support incorporates a mixer designated generally by the reference character 14. In the present embodiment, each mixer 14 comprises a relatively deep cup 15 that is desirably drawn from sheet metal and includes a circular bottom wall 16, a cylindrical peripheral wall 17, and a horizontal flange 18 that is flared outwardly from the top of said cylindrical wall. The support 12 has a central opening downwardly through which the cup 15 is projected so that the flange 18 engages the top surface of the surrounding portion of the support. Said flange is welded or otherwise secured to the support. Loosely received over the lower end of the cup 15 is a shutter 20 that is preferably drawn from sheet metal to provide a cylindrical peripheral wall 21 and a circular bottom wall 22. The peripheral walls of the cup 15 and shutter 20 have openings 23 that correspond in size and shape, as have also their bottom walls 16 and 22. By rotatively adjusting the shutter with respect to the cup, the areas of the openings may be changed to regulate the supply of air to the mixer, as will be readily understood by those familiar with the art; and by means of a screw 25, that is threaded into the peripheral wall of the cup, and the head of which overlies an adjacent portion of the corresponding wall of the shutter, the shutter may be securely held against accidental movement in any position of adjustment.

Surrounding and secured to the lower end of the Venturi or mixing tube 10 of each of the burners 7 and 8 is a thimble 26, shown as slightly convergent at its lower end and as provided with a top flange 27 that is adapted to rest upon the previously mentioned flange 18 of the cup 15 when the burner occupies normal position with respect to the mixer.

Projected upwardly through aligned central apertures of the bottom walls of the cup 15 and shutter 20 is a conventional tip or nozzle 30 that is provided at its upper end with a gas emitting orifice. The tip or nozzle has connection with a gas supply pipe 33 that leads from a manifold, and is equipped with the usual control valve. This being common and well known practice, neither the manifold nor control valve is shown in the drawings.

The automatic flash tube lighter for the main burners 7 and 8 includes a pilot light housing 40, shown as a short cylindrical tube or sleeve having its lower end extended downwardly a slight distance through a central aperture of the aeration plate 5, the housing being permanently and rigidly secured to the aeration plate, as by welding. The aeration plate is shown as having an upwardly embossed or elevated portion 41 that surrounds the housing 40. 45 designates the flash tubes whose inner ends, shown as slightly tapered, are extended through diametrically opposed openings or notches 46 in the wall of the housing 40. Intermediate said openings or notches 46 are others designated 47, the bottoms of which are shown as slightly below the horizontal plane of the axes of the tubes 45. The planes of the outer ends of the flash tubes are at a pronounced angle to said axes, and said tubes are arranged with their longer sides at the bottom. The flash tubes are firmly secured, as by welding, to the housing 40.

The pilot burner, designated generally by the reference numeral 50, is formed by a so-called cap 51 that is fitted within the end of the pilot burner tube 52. The cap 51 has an axial gas emitting orifice 53 at the intersection of cross slots 54. The tube 52, adjacent the cap 51, occupies aligned central apertures in a disc-like locator 55 and in the bottom wall of a cup-like shield 56 that surrounds the burner and has diametrically opposed openings or notches 57, the bottoms of which are in substantially the horizontal plane of the upper end of the cap. The shield 56 controls the flow of air to the flame of the pilot burner and protects the flame from cross drafts that might extinguish it. The pilot burner tube 52 is shown as supported by a bracket 60 from a part 61 of the stove structure.

Each of the main burners is provided with a lighter port, that of the smaller burner 7 being fitted with a trailer tube 65 which extends from the side of the burner head 66 toward the adjacent flash tube 45, desirably with its axis slightly below that of the flash tube. The trailer tube 65 has a longitudinal slot 67 on its upper side, as appears from Fig. 2. When gas is turned into the main burner 7, a small amount of the gas will escape through the trailer tube 65 and be projected into the adjacent flash tube 45, entraining air with the gas to produce a highly combustible mixture which is ignited by the pilot burner within the housing 40, the resultant flame traveling back through the flash tube and along the slot 67 of the trailer tube to the main burner, igniting the gas issuing from the ports 69 of the latter. Because the peripheral portion of the larger burner 8, where the lighter port is located, so closely approaches the outer end of the adjacent flash tube 45, there is no necessity for a trailer tube, such as 65 of the burner 7, but in order to provide sufficient port depth, especially in a sheet metal burner of the kind shown, to insure against flash back, a tube 69 is located on the interior of the head and opens through the side wall thereof, thus providing the lighter port. A carry-over port 70 may, if necessary, be made in the side wall of the burner head between the lighter port and the conventional ports 71.

In replacing the parts, after the top burner assembly has been dismantled for cleaning or other purposes, it is important that each of the main burners be associated with its respective mixer, and that the head of the burner be disposed with its lighter port in operative relation to the corresponding flash tube. To prevent the parts being otherwise re-assembled, positioning means is provided for each burner which is peculiar or individual to that burner and which prevents the burner from assuming operative connection with the wrong mixer. The positioning means, in the present embodiment of the invention, consists of studs or projections 75 that are attached to the burner supports 12 and rise a substantial distance above the flanges 18 of the mixers 14. The studs or projections 75 are received by voids or notches 76 in the flanges 27 of the thimbles 26; and the spacing apart of the studs or projections 75 and the voids or notches 76 of each positioning means differs from the spacing of the corresponding interengaging parts of the other positioning means.

Grates 80, each consisting of a heavy wire ring 81 and U-shaped wire ribs 82 that are welded or otherwise rigidly connected to the ring, are adapted to be arranged over and in substantially concentric relation to the burners 7 and 8, with approximately half the circumference of each grate bearing upon the portion of the flange 4 that extends about the adjacent end of the aeration plate 5, while the opposite side of the grate rests upon one of the arcuate flanges 84 of a grate support 85 that extends across the middle portion of the aeration plate and is connected, at its ends, preferably by welding, to the straight side portions of the flange 4. The connection is desirably made through lugs 86 that depend from the ends of the support, and are relatively narrow and widely spaced apart, thereby to reduce to a minimum the transmission of heat from the aeration plate to the support 85. The top of said support is substantially flush with the stove top 1. The support is provided at its center with an opening 88 that is directly above the pilot light housing 40, and because of the formation of the portion of the support above said housing, and its relation thereto, the housing is adequately ventilated. As heat rises from the flame of the pilot burner it entrains cool air inwardly through the openings or notches 47 and across the top of the housing and upwardly within the portion of the support 85 above the housing so as to prevent undue heating of the support, the mixture of air and products from the pilot burner escaping through the opening 88. This ventilating and temperature moderating action reduces the likelihood of cracking, chipping and discoloration of the enamel coating of the support.

It is evident from the foregoing that the invention provides a top burner assembly for cooking stoves or ranges that may be very quickly and easily dismantled for cleaning or other purposes. In such a dismantling operation, the grates 80 are first removed, and each of the burners 7 and 8 is lifted out of the assembly, the thimbles 26 readily withdrawn from the cups 15 of the mixers. Thereafter, by grasping the grate support 85 at about the center, the aeration plate, to which the pilot light housing 40 and flash tubes 45 are permanently and rigidly connected, may be removed, which leaves the pilot burner 50 exposed for inspection, and cleaning if necessary. The dismantling of the assembly does not disturb the adjustment of the air shutters 20, so that when the parts are re-assembled there is no need of giving any attention to the shutters; and because the mixers, of which said shutters are a part, are rigidly connected to the stove top through the medium of the burner supports 12, it is evident that the mixers are always in proper relation to the other parts of the assembly. When the aeration plate 5 is replaced within the opening of the stove top, and its peripheral flange 4 is brought to rest upon the seat 3, the openings 9 will be directly over the mixers 14 and the pilot burner will be centrally located within the housing 40. The burners are next replaced by projecting their Venturi or mixing tubes 10 downwardly through the openings 9 and nesting the thimbles 26 within the cups 15 of the mixers, with the flanges 27 of the thimbles engaging the flanges 18 of said cups, this operation being permitted by registration of the studs or projections 75 with the voids or notches 76. In the foregoing it has been assumed that each burner has been accorded its proper place in the assembly, and that its lighter port is disposed in operative relation to the adjacent flash tube. For example, in the case of the burner 7, the trailer tube 65 will be in the vertical plane of the contiguous flash tube and somewhat below the axis thereof. On the other hand, if an attempt should be made to wrongly associate the burners and mixers, the flanges 27 would strike the studs or projections 75 and prevent the burners from assuming operative connection with the mixers and flash tubes. After the burners are replaced, the grates 80 are returned to their former positions in the assembly.

Having thus described our invention, what we claim is:

1. In combination, a stove top having an opening for a top burner assembly, an aeration plate occupying said opening, means supporting the plate with its perimeter adjacent the edge of the top about said opening, said plate having a burner opening, a support below said burner opening, a mixer equipped with an adjustable air shutter carried by said support below the burner opening of the aeration plate, a main burner including a mixing tube that projects downwardly through said burner opening and has detachable connection with the mixer, a pilot light housing incorporated in the aeration plate and opening downwardly through the same, said housing rising a distance above the plate, a pilot burner in operative relation to said housing, a flash tube extending from and communicating with the interior of said housing and being disposed above and in spaced relation to the aeration plate, the end of the flash tube remote from the housing being adjacent the main burner, the latter having a lighter port, and positioning means for locating the main burner with its lighter port in operative relation to the flash tube.

2. In combination, a stove top having an opening surrounded by a seat, a basin-like aeration plate occupying said opening and provided with an edge flange resting on said seat, said plate having a burner opening, a support below said opening, a mixer equipped with an adjustable air shutter carried by said support below the burner opening of the aeration plate, a main burner including a mixing tube that projects downwardly through said burner opening and has a slip-joint connection with the mixer, a pilot light housing incorporated in the aeration plate and opening downwardly through the same, said housing rising a distance above the plate, a pilot burner in operative relation to said housing, a flash tube extending from and communicating with the interior of said housing and being disposed above and in spaced relation to the aeration plate, the end of the flash tube remote from the housing being adjacent the main burner, the latter having a lighter port, and positioning means for locating the main burner with its lighter port in operative relation to the flash tube.

3. In combination, a stove top having an opening for a burner assembly, a basin-like aeration plate occuying said opening and provided with a burner opening, a burner support secured to and depending from the stove top beneath the aeration plate, a mixer equipped with an adjustable air shutter incorporated in the burner support and located below the burner opening of the aeration plate, a main burner including a mixing tube that projects downwardly through said burner opening and has separable connection with the mixer, a pilot light housing carried by and opening downwardly through the aeration plate and rising a distance above the latter, a pilot burner in substantially fixed relation to the stove top in a position to occupy said housing, a flash tube communicating with the interior of the housing and extending therefrom toward the main burner in spaced relation to said plate, the main burner having a lighter port, and positioning means comprising cooperating parts on the burner and burner support for locating the burner with its lighter port in operative relation to the flash tube.

4. In combination, a stove top having an opening surrounded by a seat, a basin-like aeration plate occupying said opening and provided with an edge flange resting on said plate having a burner opening, a burner support in the form of a yoke having its ends secured to the stove top, the support extending beneath the aeration plate, a mixer equipped with an adjustable air shutter incorporated in the burner support and located below the burner opening of the aeration plate, a main burner including a mixing tube that projects downwardly through said burner opening and has a separable connection with the mixer, a pilot light housing carried by and opening downwardly through the aeration plate and rising a distance above the latter, a pilot burner in substantially fixed relation to the stove top and so positioned as to occupy said housing, a flash tube communicating with the interior of and extending from said housing toward the main burner, said tube being spaced above the aeration plate, the main burner having a lighter port, and positioning means comprising cooperating parts on the main burner and the burner support for locating the main burner with its lighter port in operative relation to the flash tube.

5. In combination, a stove top having an opening for a burner assembly, a basin-like aeration plate of substantially the same area as said opening, means supporting the aeration plate within the opening with its peripheral portion adjacent the edge of the stove top about the opening therein, said plate having a burner opening, a burner support below the last mentioned opening, a mixer sustained by the burner support beneath the burner opening, a main burner including a mixing tube that projects downwardly through said burner opening and has separable connection with the mixer, a pilot light housing generally in the form of a cylindrical wall secured to and rising a distance above the aeration plate and opening at its lower end through said plate, a pilot burner in substantially fixed relation to the stove top in a position to occupy said housing, said burner comprising a cap having gas emitting orifices, a gas supply tube to the end of which said cap is attached, a locator on said tube positioned within and extending across the bottom of the housing, a flash tube secured to and extending from the housing toward the main burner in spaced relation to the aeration plate, the proximal end of said tube entering the housing, the main burner having a lighter port, and positioning means for locating the main burner with its lighter port in operative relation to the flash tube.

6. The combination defined by claim 5, wherein the cylindrical wall that constitutes the pilot light housing is provided with an opening adjacent its upper end in circumferentially spaced relation to the flash tube.

7. In combination, a stove top having an opening for a burner assembly, a basin-like aeration plate of substantially the same area as said opening, means supporting the aeration plate within the opening with its peripheral portion adjacent the edge of the stove top about the opening therein, said plate having a burner opening, a burner support below the last mentioned opening, a mixer sustained by the burner support beneath the burner opening, a main burner including a mixing tube that projects downwardly through said burner opening and has separable connection with the mixer, a pilot light housing generally in the form of a cylindrical wall secured to and rising a distance above the aeration plate and opening at its lower end through said plate, a pilot burner in substantially fixed relation to the stove top in a position to occupy said housing, said burner comprising a cap having gas emitting orifices, a gas supply tube to the end of which said cap is attached, a disc-like locator surrounding the tube adjacent the cap, a cup-like shield surmounting the locator and enclosing the cap, the locator being positioned within and extending across the bottom of the housing, a flash tube secured to and extending from the housing toward the main burner above and in spaced relation to the aeration plate, one end of said tube entering the housing above the top of said shield, the main burner having a lighter port, and positioning means for locating the main burner with its lighter port in operative relation to the flash tube.

8. The combination defined by claim 7, wherein the cup-like shield has openings in its peripheral wall whose lower sides are in substantially the horizontal plane of the pilot burner cap.

9. In combination, a stove top having an opening for a burner assembly, a basin-like aeration plate corresponding in size and shape with said opening, means supporting said plate with its peripheral portion adjacent the edge of the top about said opening, said plate having burner openings that are spaced a substantial distance apart, a support beneath each of the burner openings, a mixer sustained by each burner support, two main burners, each including a mixing tube projected downwardly through one of the burner openings and having separable connection with the mixer therebelow, a pilot light housing carried by and rising a distance above the aeration plate intermediate the burner openings, said housing opening downwardly through the plate, a pilot burner supported in fixed relation to the stove top and in position to occupy said housing, flash tubes communicating with the interior of and extending in opposite directions from said housing toward the main burners, said tubes being spaced a distance above the aeration plate, each main burner having a lighter port, and positioning means for locating each main burner with its lighter port in operative relation to the adjacent flash tube.

10. The combination defined by claim 9, wherein the positioning means associated with each main burner comprises parts on the burner, and other parts carried by the burner support for interengagement with the former parts, the parts of the positioning means associated with one main burner differing from those associated with the other main burner so that each such burner is capable of assuming operative connection only with the mixer wherewith it is intended for use.

11. The combination defined by claim 9, wherein the positioning means for each main burner comprises parts on the burner and on the burner support, respectively, arranged for interengagement, one of said parts consisting of projections and the other of said parts consisting of a flange having voids for the reception of said projections.

12. The combination defined by claim 9, wherein the positioning means for each main burner comprises parts on the burner and on the burner support, respectively, arranged for interengagement, one of said parts consisting of projections and the other of said parts consisting of a flange having voids for the reception of said projections, the relation of the projections and voids of the positioning means associated with one burner differing from that of the projections and voids of the positioning means associated with the other burner.

13. In combination, a stove top having an oblong opening surrounded by a depressed seat, a basin-like aeration plate occupying said opening and having an edge flange resting on said seat, said plate having a main burner opening near each of its ends and a pilot light opening intermediate the main burner openings, a burner support below each main burner opening, a mixer incorporated in each burner support in vertical alignment with the corresponding main burner opening, two main burners, each including a mixing tube that is extended downwardly through the corresponding main burner opening, a thimble applied to the lower end of the mixing tube of each main burner for nesting within the corresponding mixer and having a flange overlying a surrounding part of the burner support, the flange having voids that are spaced apart circumferentially of the flange, correspondingly spaced studs rising from the burner support so as to be received by said voids when the thimble is projected into the mixer, a pilot light housing having its lower end secured to the aeration plate about the aforesaid pilot light opening, flash tubes extending from said housing to within a short distance of the main burners, each main burner having a lighter port aligned with the adjacent flash tube, a grate support disposed across the aeration plate midway between the ends of the latter and having its ends connected to the aeration plate, said grate support including arcuate flanges substantially in the plane of the edge flange of said plate, and a grate over each burner having its edge portion resting upon an arcuate flange of the grate support and on the edge flange of the adjacent end portion of the aeration plate.

14. The combination defined by claim 13, wherein the portion of the aeration plate adjacent to and surrounding each main burner opening is embossed upwardly.

15. The combination defined by claim 13, wherein the portion of the aeration plate adjacent to and surrounding the pilot light housing is embossed upwardly.

16. In combination, a stove top having an oblong opening surrounded by a depressed seat, a basin-like aeration plate occupying said opening and having an edge flange resting on said seat, said plate having a main burner opening near each of its ends and a pilot light opening intermediate the main burner openings, a burner support in the form of a yoke extending transversely of and beneath the aeration plate below each main burner opening and having its ends secured to the stove top on opposite sides of the opening therein, a mixer equipped with an adjustable air shutter incorporated in each burner support below the corresponding main burner opening, two main burners, each including a mixing tube that is extended downwardly through the corresponding main burner opening, a thimble applied to the lower end of the mixing tube of each main burner for nesting within the corresponding mixer and having a flange overlying a surrounding part of the burner support, the flange having voids that are spaced apart circumferentially of the flange, correspondingly spaced studs rising from the burner support so as to be received by said voids when the thimble is projected into the mixer, a pilot light housing in the form of an upstanding wall having its lower end secured to the aeration plate about the aforesaid pilot light opening, flash tubes rigidly secured to said upstanding wall and communicating with the interior of the housing, each flash tube being spaced a substantial distance from the underlying portion of the aeration plate and extending to within a short distance of one of the main burners, each main burner having a lighter port opposite the adjacent end of the corresponding flash tube, said upstanding wall having openings on each side adjacent its upper end and intermediate said flash tubes, a grate support disposed across the aeration plate midway between the ends of the latter and having its ends connected to the aeration plate, said grate support including arcuate flanges substantially in the plane of the edge flange of said plate, the body of the support being elevated between the flanges thereof so that said body portion is in substantially the plane of the stove top, said support having an aperture above the pilot light housing, and a grate over each burner having its edge portion resting upon an arcuate flange of the grate support and on the edge flange of the adjacent end portion of the aeration plate.

CARL F. SCHLENK.
EVANS W. CHEESEMAN.
RUSSELL L. PATRICK.

References Cited in the file of this patent

UNITED STATES PATENTS

| Number | Name | Date |
|---|---|---|
| 1,991,503 | Hobson | Feb. 19, 1935 |
| 2,032,877 | Harper | Mar. 3, 1936 |
| 2,054,250 | Harper | Sept. 15, 1936 |
| 2,087,720 | Guenther | July 20, 1937 |
| 2,180,645 | Sherman | Nov. 21, 1939 |
| 2,187,169 | Mills | Jan. 16, 1940 |
| 2,320,754 | Sherman | June 1, 1943 |
| 2,485,359 | Cook | Oct. 18, 1949 |
| 2,518,911 | Lamar | Aug. 15, 1950 |
| 2,530,183 | Smallwood | Nov. 14, 1950 |